Aug. 28, 1956   J. K. MOYER ET AL   2,760,808
HANDLE FOR GLASS CONTAINERS
Filed June 16, 1953

INVENTOR.
JOSEPH K. MOYER.
BY RAYMOND C. YAMA.
Louis V. Lucia
ATTORNEY.

United States Patent Office 2,760,808
Patented Aug. 28, 1956

2,760,808

HANDLE FOR GLASS CONTAINERS

Joseph K. Moyer, West Hartford, and Raymond C. Yama, Windsor, Conn., assignors to The Silex Company, Hartford, Conn., a corporation of Connecticut Application June 16, 1953, Serial No. 362,094

2 Claims. (Cl. 294—31.2)

This invention relates to a handle for glass containers and more particularly to a handle which is adapted to be secured to the neck portion of a glass container and which will accommodate variations due to commercial tolerances in the diameter of the neck portion so as to eliminate looseness between the handle and the container.

It is an object of this invention to provide a novel construction for such a handle which will accommodate maximum variations in diameters, is economical to produce, and will greatly facilitate attachment of the handle to the container.

A still further object of the invention is to provide such a handle having a slack take-up member that may be readily and economically provided therefor and easily secured thereto prior to the attachment of the handle to the glass container.

A still further object is to provide such a take-up member which may be securely retained upon the handle prior to its being attached to the glass container.

Further objects and advantages of this invention will be more clearly understood from the following description and from the accompanying drawings in which.

Figure 1:
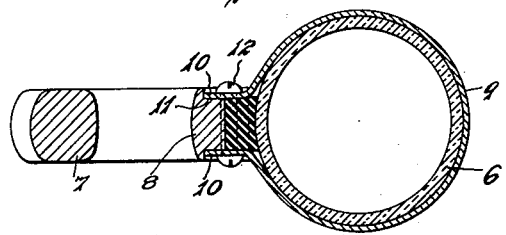
Fig. 1 is a sectional plan view on line 1—1 of Fig. 2.

As shown in the drawings, the numeral 5 indicates a conventional glass container having a neck portion 6 which, as shown, is of tubuluar form having parallel sides. It is well known that in the production of such glass containers it is extremely difficult to maintain uniform diameters of the said neck portions and, therefore, impractical to require such uniformity within close tolerances; the result being that it becomes necessary to provide a handle construction which can be attached to the containers of maximum diameter as well as to those of minimum diameter without having looseness between the handle and the said neck portion of the container.

Our present invention provides a handle 7 which may be of any desired shape having a base portion 8 to which may be attached the end portions of an attachment, or collar band, 9 which surrounds the neck 6 and has end portions 10—10 that extend to opposite sides of the base portion 8 and preferably fit into recesses 11—11 in the said sides. The handle is secured to the said band by suitable fastening means, such as screws 12—12, which extend through the end portions 10—10 and the base portion 8.

Figure 3:
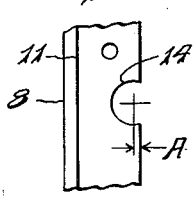
Fig. 3 is an enlarged side view of a portion of the handle.
Figure 4:
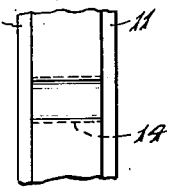
Fig. 4 is a rear view of said portion of the handle.
Figure 5:
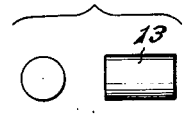
Fig. 5 is an end and a side view of the slack take-up member embodied in this invention.

In order to eliminate looseness of the handle when so attached to the glass container, we provide, by this invention, a resilient slack take-up member 13 which is preferably in the form of a cylindrical plug of a length substantially equal to the thickness of the base portion 8 of the handle between the bottoms of the recesses 11—11. The said handle is provided with a groove 14 which extends crosswise in the free edge of the base portion 8 between the bottoms of the said recesses 11—11; the said groove being substantially circular and having its axis located inside of the free edge of the handle portion, as indicated at "A" in Fig. 3, so as to constrict the side of the groove at the said free edge to retain the resilient plug in posiion within the said groove when it is inserted thereinto.

The said plug 13 is preferably made of a suitable resilient rubber material and is of a diameter which will permit the plug to be readily forced into the groove 13 from the side thereof so that it can be quickly attached to the handle during assembling operation, or previously thereto, to be thereby retained in attached position until the handle is secured to the container neck.

Figure 2:
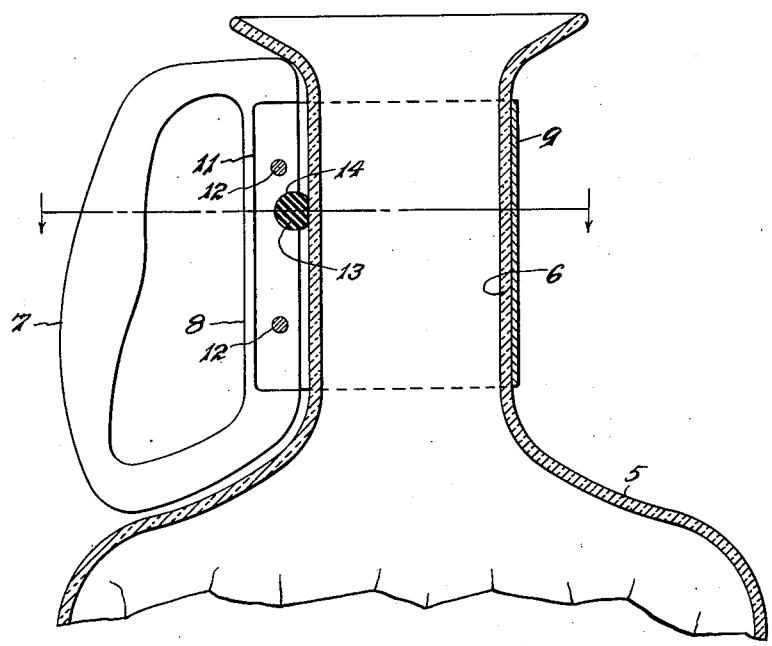
Fig. 2 is a side view showing our improved handle attached to the neck of a glass container.

When the said handle is positioned against the neck of the container, during the assembling operation, the plug 13 is compressed, as clearly shown in Figs. 1 and 2, and it thereby takes up any slack or looseness that may remain between the handle and the surface of the container neck and firmly retains the handle against movement relatively to the neck of the container.

We claim:

1. A handle including a grip portion, a base portion having a free edge, the said free edge having a groove extending transversely of the said base portion, a resilient member disposed within said groove and projecting therefrom beyond the said free edge, and a band adapted to secure said handle to a separate member; the opposite ends of said band being attached to said base portion and in abutment with the opposite ends of said resilient member for compressing said member within said groove and against the separate member.

2. A handle including a base portion with a free edge, the said free edge having a groove therein extending to the opposite sides of said base portion, the opening of said groove at the free edge being constricted, a resilient member contained within said groove and retained therein by the sides of said constricted opening, a band having end portions attached to the opposite sides of the base portion and adapted to secure said handle to a separate member; the said end portions of the band abutting the opposite ends of the resilient member and retaining it compressed within the groove with a portion of said resilient member projecting through said opening and beyond said free edge and in engagement with the said separate member and thereby preventing looseness between the handle and separate member.

References Cited in the file of this patent

UNITED STATES PATENTS

| | | |
|---|---|---|
| 2,055,854 | Stibbe | Sept. 29, 1936 |
| 2,072,934 | Wolcott | Mar. 9, 1937 |
| 2,378,867 | Reichart | June 19, 1945 |
| 2,495,688 | Blakeslee | Jan. 31, 1950 |
| 2,551,300 | Sullivan | May 1, 1951 |
| 2,554,761 | Walder | May 29, 1951 |
| 2,605,010 | Sieling | July 29, 1952 |